United States Patent
Chen et al.

(10) Patent No.: US 11,422,789 B2
(45) Date of Patent: Aug. 23, 2022

(54) SYSTEM AND METHOD FOR IMPLEMENTING SOFTWARE RELEASE VERSION UPDATE AUTOMATION TOOL

(71) Applicant: JPMorgan Chase Bank, N.A., New York, NY (US)

(72) Inventors: Fei Chen, London (GB); Amit Aggarwal, Jersey City, NJ (US); Steven Sharp, North Berwick (GB); Elizabeth Roland, Maspeth, NY (US); Heydon Costello, Glasgow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 17/201,502

(22) Filed: Mar. 15, 2021

(65) Prior Publication Data

US 2021/0286610 A1    Sep. 16, 2021

Related U.S. Application Data

(60) Provisional application No. 62/989,157, filed on Mar. 13, 2020.

(51) Int. Cl.
*G06F 9/445* (2018.01)
*G06F 8/65* (2018.01)

(52) U.S. Cl.
CPC .................................. *G06F 8/65* (2013.01)

(58) Field of Classification Search
CPC .......................................................... G06F 8/65
USPC .................................................. 717/168-178
See application file for complete search history.

(56) References Cited

U.S. PATENT DOCUMENTS 9,886,257 B1 *    2/2018   Sorenson, III ............ G06F 8/65

* cited by examiner

*Primary Examiner* — Chuck O Kendall
(74) *Attorney, Agent, or Firm* — Greenblum & Bernstein, P.L.C.

(57) ABSTRACT

The invention relates generally to a system and method for implementing a software release update automation tool without using version numbers. An embodiment of the present invention is directed to an Automation Tool that manages software promotion from different perspectives by using dynamic value injection and automation. This efficiently eliminates or substantially reduces human efforts and manual tasks on the complicated process of version management. In addition, the Automation Tool of an embodiment of the present invention may further take current version snapshots, manage change logs for audit, perform version validation for match and unmatched build post promotion, and provide email or other communication notification and/or alerts.

20 Claims, 10 Drawing Sheets

Please deploy the following to PTE/UAT
Aim Commands: ― 202 aim update link quad:/▮-central/▮-processing/pte—target quad:/▮-central/▮-processing/release-1.0-build-170510b8

...

aim update link quad:/▮-central/▮-messaging/pte—target quad:/▮-central/▮-messaging/release-1.0-build-e4ad892b -- entitleadmin aim update link quad:/▮-central/▮-ux/pte—target quad:/▮-central/▮-ux/release-1.0-build-ad89007b -- entitleadmin aim update link quad:/▮-central/▮-recon/pte—target quad:/▮-central/▮-recon/release-1.0-build-ce83712 -- entitleadmin
                                                                                                            ― 220

― 210 quad:/▮-central/▮-messaging/
quad:/▮-central/▮-ux/
quad:/▮-central/▮-recon/
quad:/▮-central/▮-migration-utility/
quad:/▮-central/▮-processing/
quad:/▮-central/▮-processing/
quad:/▮-central/▮-logging/
config:/▮-central/▮-processor/
config:/▮-central/▮-repository/
config:/▮-central/▮-param/
config:/▮-central/▮-param/
config:/▮-central/▮-dvp/
aim_dp_ru.txt (END)
― 224

```
createAimRUSnapshot( ) {                    310
while read =r line; do sourceru = 'aim print entry $line |grep "$(SourceEnv) -> " '
Targetru = 'aim print entry $line |grep "$(TargetEnv) -> " '
echo $line $sourceru $targetru 'date' $(UserId) >> $(aimVersionSnapshot)
echo $line $sourceru $targetru 'date' $(UserId) | tee -a -1 $(DetailLogFile) && echo " " >> $(DetailLogFile)
done < ${aimReleaseUnit}         312
}
```

Figure 3

```
executeAimCmd() {
while read -r line; do echo $line
    ReleaseUnit=`echo $line | awk '{print $1}'`
    Version=`echo $line | awk '{print $4}'`
    sourceVersion=`echo $line | awk '{print $4}'`
    targetQuadVersion=`echo $line | awk '{print $7}'`
    targetConfigVersion=`echo $line | awk '{print $8}'` if [[ "${sourceVersion}" != "${targetVersion}" ]]; then
        if [[ $line =~ ^config ]]; then
            aim update link ${ReleaseUnit}${TargetEnv} --target ${sourceVersion} --entitleadmin
            echo "rollback-aim update link ${ReleaseUnit}${TargetEnv} --target ${targetConfigVers
            echo ""
        else
            aim update link ${ReleaseUnit} ${TargetEnv} --target ${ReleaseUnit}${sourceVersion} --
            echo "rollback-aim update link ${ReleaseUnit}${TargetEnv} --target ${ReleaseUnit}${ta
ile)
            echo ""
        fi
    else
        echo "!! Update not need - ${sourceVersion} == ${targetVersion} - ${ReleaseUnit} "
    fi ((counter++))
done < ${aimVersionSnapshot}
}
```

```
validate( ) {
MatchedCounter=0
UnmatchedCounter=0 while read -r line: do
    sourceVersion = 'aim print entry $line |grep "${SourceEnv| ->" | awk '(print $3)"
    targetVersion = 'aim print entry $line |grep "${TargetEnv| ->" | awk '(print $3)"

if [ "${targetVersion}" = "${sourceVersion}" ] ; then
        ((matchedCounter++))
        echo " = =${matchedCounter} Matched ${TargetEnv) - $(targetVersion) == $(SourceEnv) - $(sourceVersion) - $line"
                                                      510
    else
        ((unmatchedCounter++))
        echo "|"${unmatchedCounter} UnMatched ${TargetEnv) - $(targetVersion) != $(SourceEnv) - $(sourceVersion) - $line"
                                                          512
    fi
    ((counter++))
sleep 2 #sleep 3 seconds      514
done < ${aimReleaseUnit)
}
```

Figure 5

```
>>>>aim>update link command SKIPPED WED Month Date Time Year

>>>aim>xxx xxxx xxxx Wed Month Date Time Year
==1 Matched pte-release-1.0-build-6910bcb7 -- sit-release-1.0-build-6910bcb7 -- quad:/              -messaging/
==2 Matched pte-release-1.0-build-66b376e2 -- sit-release-1.0-build-66b376e2 -- quad:/              -ux/
==3 Matched pte-release-1.0-build-3be906c7 -- sit-release-1.0-build-3be906c7 -- quad:/              -recon/
==4 Matched pte-release-1.0-build-cdd6ff8e -- sit-release-1.0-build-cdd6ff8e -- quad:/              -migration-utility/
==5 Matched pte-release-1.0-build-be9cfd11 -- sit-release-1.0-build-be9cfd11 -- quad:/              -processing/
==6 Matched pte-release-1.0-build-bf6e0416 -- sit-release-1.0-build-bf6e0416 -- quad:/              -processing/
==7 Matched pte-release-1.0-build-30c8f214 -- sit-release-1.0-build-30c8f214 -- quad:/              -logging/
==8 Matched pte-config:/                       -- sit-release-1.0-build-bf6e0416 == sit-config:/    -
     -processor/release 1.0-build-bf6e0416 == sit-config:/
     -processor/release 1.0-f6e0416 = config:/
     -processor/
...
<<<
```

SYSTEM AND METHOD FOR IMPLEMENTING SOFTWARE RELEASE VERSION UPDATE AUTOMATION TOOL

CROSS REFERENCE TO RELATED APPLICATIONS

The application claims priority to U.S. Provisional Application 62/989,157, filed Mar. 13, 2020, the contents of which are incorporated herein in their entirety.

FIELD OF THE INVENTION

The invention relates generally to a system and method for implementing a software release update automation tool by using dynamic value injection and automation without reliance on version numbers.

BACKGROUND OF THE INVENTION

Software release promotion is a critical step in the software development lifecycle (SDLC). This process determines accuracy, quality, and integrity of software build and configurations to be deployed in new environments and eventually live production. In a traditional SDLC process, software promotion practice requires substantial human efforts, resources and time to manage different build version numbers to promote a build from one environment to another environment. Moreover, additional work is required when multiple development streams and/or branches are used. The current approach has several problems and challenges because version numbers are managed by humans making this manual task prone to typos and other errors. In addition, when last minute new builds are required and available, the previous planned build number and version becomes outdated instantly. These problems cause deployment of incorrect and/or outdated software versions in a new environment, thereby losing quality control of the software release.

These and other drawbacks exist.

SUMMARY OF THE INVENTION

According to one embodiment, the invention relates to a system that implements a software release update automation tool using dynamic value injection and without reliance on version numbers when promoting a new version from a source environment to a target environment. The system comprises: a memory component that stores software version data; an interactive user interface, coupled to the memory component, configured to receive user input; and a computer processor, coupled to the memory component and the interactive user interface, and further programmed to perform the steps of: executing an Automation Tool to promote the new version from a source environment to a target environment; generating a snapshot of a current software version of the source environment and target environment wherein the snapshot comprises a set of values representing a release unit, the target environment and source version; performing a comparison to identify one or more differences between a build version and a configuration version associated with the source environment and the target environment; based on the comparison and one or more differences, promoting the new version to a target environment by dynamically injecting the set of values from the snapshot; performing a verification of post promotion build and configuration versions to identify matched and unmatched status for a plurality of software elements; based on the verification, generating a configuration log; and transmitting, via a communication network, the configuration log to one or more recipients.

According to another embodiment, the invention relates to a method that implements a software release update automation tool using dynamic value injection and without reliance on version numbers when promoting a new version from a source environment to a target environment. The method comprises the steps of: executing, via a computer processor, an Automation Tool to promote the new version from a source environment to a target environment; generating, via the computer processor, a snapshot of a current software version of the source environment and target environment wherein the snapshot comprises a set of values representing a release unit, the target environment and source version; performing, via the computer processor, a comparison to identify one or more differences between a build version and a configuration version associated with the source environment and the target environment; based on the comparison and one or more differences, promoting the new version to a target environment by dynamically injecting the set of values from the snapshot; performing a verification of post promotion build and configuration versions to identify matched and unmatched status for a plurality of software elements; based on the verification, generating a configuration log; and transmitting, via a communication network, the configuration log to one or more recipients.

An embodiment of the present invention is directed to a specially programmed computer system comprising one or more computer processors, interactive interfaces, electronic storage devices, and networks. The computer implemented system and method described herein provide unique advantages to entities, users and other participants. Benefits and advantages of the various embodiments of the present invention may include substantial reduction or elimination of human efforts managing software build versions and errors and inefficiencies associated with software promotion processes with wrong or outdated versions. This leads to improved quality, efficiency and stability.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 2 is an exemplary interactive user interface, according to an embodiment of the present invention.

FIG. 3 is an exemplary interactive user interface, according to an embodiment of the present invention.

FIG. 4 is an exemplary interactive user interface, according to an embodiment of the present invention.

FIG. 5 is an exemplary interactive user interface, according to an embodiment of the present invention.

FIG. 8 is an exemplary interactive user interface, according to an embodiment of the present invention.

DETAILED DESCRIPTION OF THE PREFERRED EMBODIMENT(S)

Figure 1:
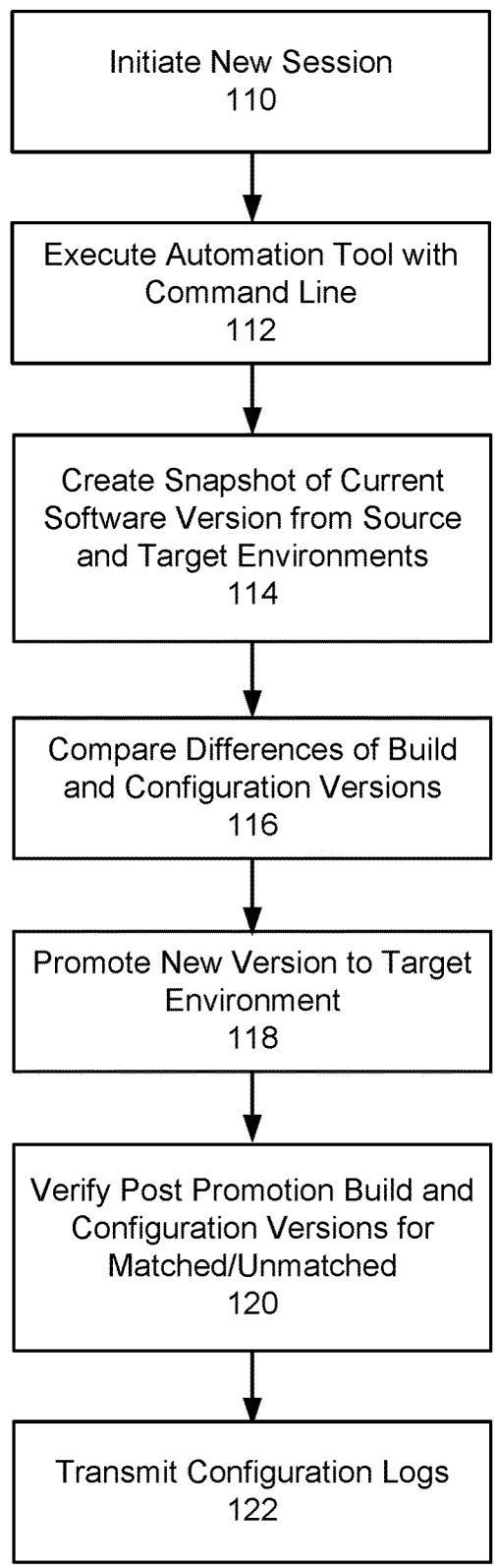
FIG. 1 is an exemplary process flow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

With current systems, it is difficult to manage build versions due to the constant and frequent changes as well as the format of code release branch information (e.g., build versions).

An embodiment of the present invention is directed to implementing a software release update automation tool that does not rely on version numbers and version management. An Automation Tool of an embodiment of the present invention manages software promotion from different perspectives by using dynamic value injection and automation. This efficiently eliminates or substantially reduces human efforts and manual tasks involved in the complicated process of version management. In addition, the Automation Tool of an embodiment of the present invention may further take current version snapshots, manage change logs for audit, perform version validation for match and unmatched build post promotion, and provide notifications and/or alerts.

An embodiment of the present invention gathers information from a source environment and a target environment and then performs a comparison of build and configuration versions. In software development, various stages may involve different environments for certain tasks. This may include a development environment and system integration tasks. After system integration tasks are verified and passed, the current version becomes a release candidate which may change frequently. The release candidate may represent a specific version that is based on the source environment at the time of check. The release candidate may represent the new version that will be used in a target environment at runtime. With an embodiment of the present invention, the snapshot that represents a current version is compared against a target environment, where a new version identified in the source environment is collected at runtime for release promotion. An embodiment of the present invention then promotes the new version generated dynamically at the time of check to the target environment.

For example, a source environment may change throughout a software development process. When a Quality Assurance (QA) deployment is perform, SIT may transition to QA. During UAT, QA environment may transition to User Acceptance environment. During a production release, UAT version may transition to production. An embodiment of the present invention may perform a comparison between environments to determine whether there are matched or unmatched components. A result of matched components indicates that the promotion was performed correctly.

An embodiment of the present invention may be based on built-in commands (e.g., Unix commands) and programs as well as an infrastructure management platform command line interface (CLI). For example, an embodiment of the present invention may load a configuration file including release unit entries and retrieve release version from a source environment to promote to a new target environment at runtime.

An embodiment of the present invention is directed to improving SDLC software release quality by control as well as improving SDLC software release efficiency by automation and scalability. With an embodiment of the present invention, the Automation Tool promotes compliance with change audit and monitoring on software releases. In addition, an embodiment of the present invention provides an opportunity to capture release data for statistics, analytics and/or troubleshooting usage. An embodiment of the present invention may further integrate with re-enforced machine learning to plan, predict, and automate release process (e.g., reward to successful code promotion and no rollback, penalize code promotion with multiple promotion or rollback, build quality release process, etc.).

An embodiment of the present invention is directed to improving scalability of software development and release automation. With the Automation Tool, an embodiment of the present invention may apply the same (or similar) automation to one release unit or multiple release units. Current solutions are limited to a pipeline approach where support is provided one module at a time. In addition, such solutions require additional hardware, software and an experienced team to maintain the solution platform.

FIG. 1 is an exemplary process flow, according to an embodiment of the present invention. At step 110, a new session may be initiated. At step 112, an automation tool of an embodiment of the present invention may be executed. At step 114, the automation tool may create a snapshot of a current software version from a source environment and a target environment. At step 116, the automation tool may compare and identify any differences between a build version and a configuration version. At step 118, a new version may be promoted to the target environment. At step 120, an embodiment of the present invention may verify post promotion build and configuration versions. At step 122, logs may be generated and transmitted as a notification or other communication. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Each step is discussed in more detail below.

At step 110, a new session may be initiated. For example, a user may login to a system to establish new session. The new session is part of a software deployment process. An embodiment of the present invention seeks to reduce manual effort and requirements during a software build process. A new session may be initiated when there is a software build or something ready to promote.

At step 112, an automation tool of an embodiment of the present invention may be executed. This may involve a release manager running the automation tool with a command line interface using source and target environment parameters. The Automation Tool may be initiated by other mechanisms, interfaces, etc.

At step 114, the automation tool may create a snapshot of a current software version from a source environment and a target environment. For example, a snapshot of a current state or version may be taken of a target environment. This snapshot information may also be used to address disruption, impact or instability associated with introducing a new change or an updated version. This information may also be used for preparation, troubleshooting and recovery or rollback purposes.

According to an exemplary illustration, a snapshot may be taken of the source environment and the target environment. The snapshot information may relate to a software release unit, software repository, software build, etc. For example, the source environment may run version 2 and target environment may run an older version, such as version 1. The snapshot may identify a release unit and a current existing version of a software module or component from a source environment and a target environment. Because environments change dynamically and frequently, information may be gathered/collected often so that working versions can be tracked.

At step 116, the automation tool may compare and identify any differences between a build version and a configuration version. For example, an embodiment of the present invention may compare the different versions to identify whether a change has occurred. The comparison may be applied to multiple software units, modules and/or components. For example, an embodiment of the present invention may compare build and configuration versions for the source environment and the target environments. Accordingly, if a change is detected, the target environment may be promoted. If no change is detected, the process may skip the software promotion process and continue.

At step 118, a new version may be promoted to the target environment. An embodiment of the present invention may perform a decisioning step to identify and select any units, modules and/or components that require or are ready for a new promotion.

At step 120, an embodiment of the present invention may verify post promotion build and configuration versions. This may involve identifying matched or unmatched version data and performing a comparison to verify that the process was performed correctly. For example, fully matched results indicate that the promotion to the target environment was performed correctly.

At step 122, logs may be generated, saved and transmitted as a notification or other communication. This log data may be used for audit, change confirmation, notification and alerts.

FIG. 2 is an exemplary interactive user interface, according to an embodiment of the present invention. FIG. 2 illustrates a comparison between a conventional human process 210 and an automation process 212 provided by the Automation Tool. Section 210 illustrates an "update" action on four individual release units. Section 210 shows that each action is performed sequentially requiring the process to run four times. More specifically, the process involves each of: processing, messaging, UX and recon. 202 represents an update action, within a PTE, relating to a build version, identified as "release-1.0-build-170510b8" which includes a random hash. As shown by 220, a build version is managed and updated by a human on release plan. 220 represents another build version identified as "release-1.0-build-ce83712" which includes a random hash. This is difficult to manage and prone to human errors. In addition, the version is outdated and obsolete as soon as a new build version is made available which can be often during the SDLC process. As the number of release units and actions increase in each environment, the process becomes more complex and difficult to manage.

As shown by 222, the Automation Tool of an embodiment of the present invention removes build version numbers which are not needed because the Automation Tool retrieves a new version at runtime and is dynamically populated. Section 222 illustrates individual Release Units, components, software, etc. As shown by 222, "dp_ru.text" 224 represents a base value or text file that references a set of release units that may be applied to any environment. In this example, 224 represents a set of 12 release units where the release units may be dynamic and flexible. Notably, version information is not required. In addition, 224 may reference any number of release units, represented by any number, e.g., up to N. With an embodiment of the present invention, this set of release units may be commonly referenced in the source and target environments throughout the software release process while versions may be different. Accordingly, an embodiment of the present invention separates the configuration file and the software components. This further promotes flexibility and scalability of the invention.

FIG. 3 is an exemplary interactive user interface, according to an embodiment of the present invention. FIG. 3 illustrates Automation Tool functions. Here, FIG. 3 illustrates a snapshot function, e.g., a current software version snapshot function. As shown by 310, the Automation Tool takes a snapshot of a current software build version before a new promotion. Here, a source release unit (represented by "sourceru") and a target release unit (represented by "targetru") are identified. In this example, the release units are taken from a predefined configuration file in 224 and matched with corresponding versions in 310. Next, an echo command saves the snapshot and another echo command saves the log file. The snapshot may include a set of values, including release unit (from a previous graph); environment (e.g., source environment, target environment) and code release branch information (e.g., build version). 312 illustrates a manageable release unit configuration file.

FIG. 4 is an exemplary interactive user interface, according to an embodiment of the present invention. FIG. 4 illustrates a new software version promotion function. As shown by 410, the Automation Tool uses new versions from a source environment to promote to a target environment. As shown by 412, the Automation Tool dynamically reads or retrieves software version values at runtime. This information may be loaded from a configuration file.

FIG. 4 illustrates an action to promote a new software from a source environment to a target environment. In this example, 410 incorporates three values, namely Release Unit (represented as $(ReleaseUnit)), Target Environment (represented as $(TargetEnv)) and Source Version (represented as ${sourceVersion}). As illustrated by 410, $(ReleaseUnit) may now represent an actual release unit, ${sourceVersion} represents a new version in the source environment and $(TargetEnv) is also identified. In this example, the source environment is ahead of the target environment with new code, new features and/or other updates. Because the values are constantly changing, an embodiment of the present invention incorporates this data at execution to ensure that relevant and current information is being used and relied on.

Moreover, these values may be from a snapshot of a previous graph. As shown in FIG. 4, the values may be dynamically retrieved from "$(aimVersionSnapshot)", as shown by 412. In this example, this information is generated at runtime based on that particular moment. As shown in FIG. 4, an embodiment of the present invention extracts Release Unit data which is common for the source environment and the target environment. In addition, data associated with the target environment or target version may represent rollback information. This may be tracked for security, resiliency and other purposes.

FIG. 5 is an exemplary interactive user interface, according to an embodiment of the present invention. FIG. 5 illustrates a post software promotion validation function. By checking the target version and source version, an embodiment of the present invention confirms that the promotion was performed correctly. The validation also confirms that the correct files were promoted from the source environment to the target environment. Some mismatches may be the result of network issues, software issues, platform delays, etc. The validation may be performed more than once as needed or desired. Here, an embodiment of the present invention compares the target version and the source version. As shown by 510 and 512, the Automation Tool performs a post promotion version comparison for Matched and UnMatched status. In the example shown in FIG. 5, "target version" and "source version" are variables. The comparison may compare software elements, including Release Units and Versions (such as build version). As shown by 514, the Automation Tool loads software release unit configuration entries.

Figure 6:
FIG. 6 is an exemplary interactive user interface, according to an embodiment of the present invention.

FIG. 6 is an exemplary interactive user interface, according to an embodiment of the present invention. FIG. 6 illustrates Automation Tool CLI execution commands. As shown in FIG. 6, a user may login for authentication and validate software versions. As shown by 610, promotion of new software build may be indicated with a flag, such as –r. In this example, 610 represents a flag switch. This information may be applied as a query mode and an execution mode. The query mode may be a read only mode where data is read from a source and a target and then perform a comparison. In this mode, an action is not taken. In runtime execution mode, an embodiment of the present invention may read the data and then take an action, as represented by "–r".

Figure 7:
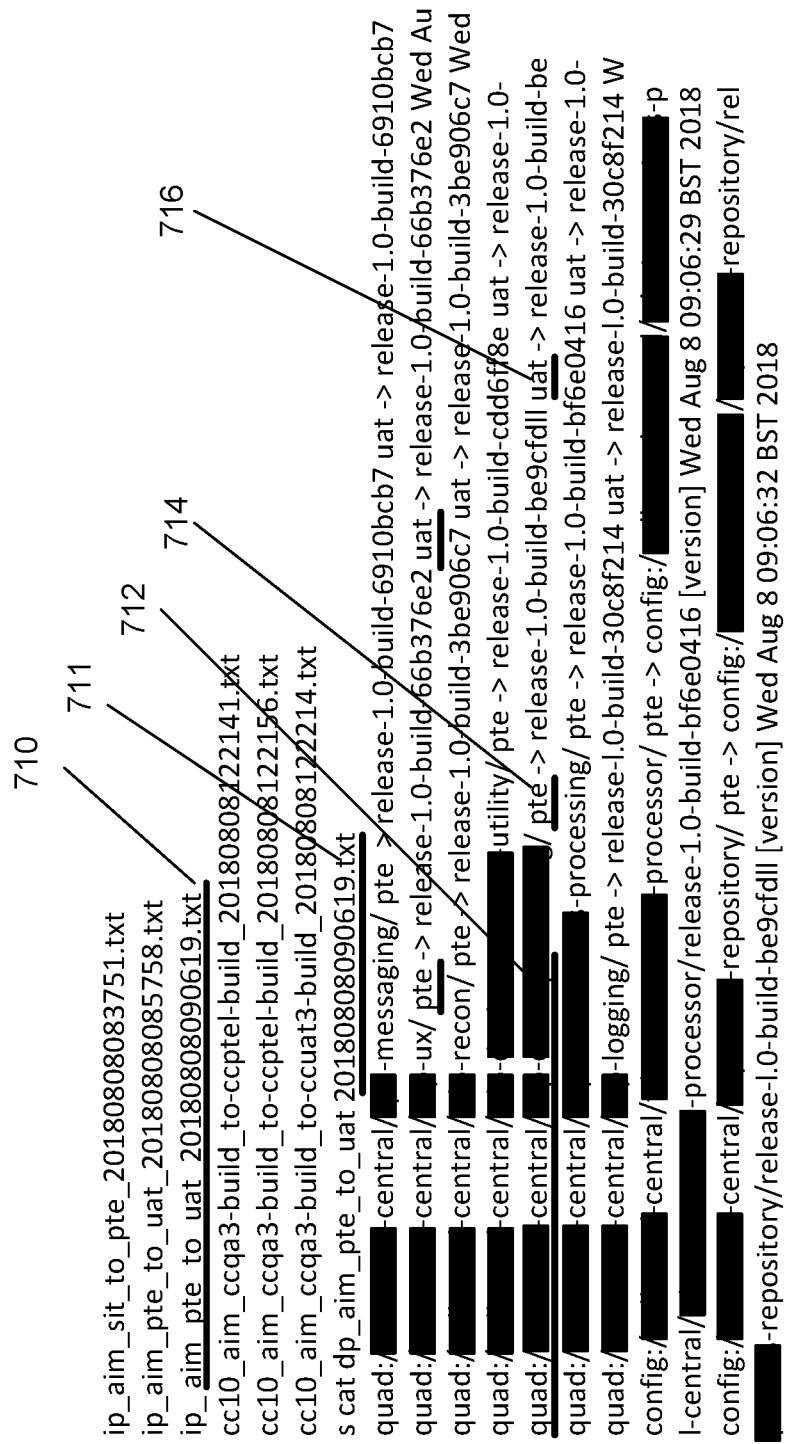
FIG. 7 is an exemplary interactive user interface, according to an embodiment of the present invention.

FIG. 7 is an exemplary interactive user interface, according to an embodiment of the present invention. FIG. 7 illustrates new software build promotion logs created on a server showing source environment version and target environment version used. As shown by 710, software build version promotion log may be created at runtime. Source environment is shown as "pte" at 714 and target environment is shown as "uat" at 716. Release unit is shown at 712.

As shown in FIG. 7, 710 represents an exemplary snapshot file. When a snapshot is taken, the information is stored in a corresponding file (e.g., txt file) using a time/date format (e.g., year, month, date, hour, seconds). Other file names and formats may be used. At execution or runtime, a snapshot of the source and target environments may be taken and stored as a text file. In the example of 710, source environment is represented by Performance Testing Environment (PTE) and target environment is User Acceptance Testing (UAT).

711 represents corresponding content associated with snapshot file represented by 710. Content 711 relates to source environment PTE and target environment UAT. The term "cat" represents concatenation or a display of the content of the snapshot file introduced at 710. In this example, the content is dynamically generated and injected at runtime. When a snapshot is taken, a file is generated and then used for software promotion deployment. This process recognizes that new builds are generated on a regular basis so that recent versions are rendered obsolete at any point in time.

712 represents a Release Unit which relates to the snapshot file identified by 710. 714 represents a source environment, such as Performance Testing Environment (PTE). 716 represents a target environment, such as User Acceptance Testing (UAT) environment. Version information is represented by "release-1.0-build-be9cfd11".

Current configuration management approach involves using multiple file names for multiple environments. Environments may include development environment (DEV); system integration testing environment (SIT); performance testing environment (PTE); user acceptance testing environment (UAT); production environment (PROD); and deal processing (e.g., project name). Other environments may be implemented.

FIG. 8 is an exemplary interactive user interface, according to an embodiment of the present invention. FIG. 8 illustrate a validation function for post promotion versions verification and notification. As shown by 810, after promotion, source and target software versions may be compared and verified. Here, 810 verifies corresponding versions. PTE release version 1.0 build 6910bcb7 is matched with SIT release version 1.0 build 6910bcb7. This relates to messaging.

The validations may be formatted into a log for audit and other purposes. When necessary, notifications, alerts and/or other communications may be generated and transmitted. This information may be shared with developer and development teams An embodiment of the present invention is directed to notification of version verification in a communication. A communication (e.g., email, text, portal communication, etc.) may be automatically generated and transmitted to one or more recipients. The notification may provide version verification information including matched and unmatched data. The recipient may respond and/or otherwise communicate back with additional follow-up actions.

Figure 9:
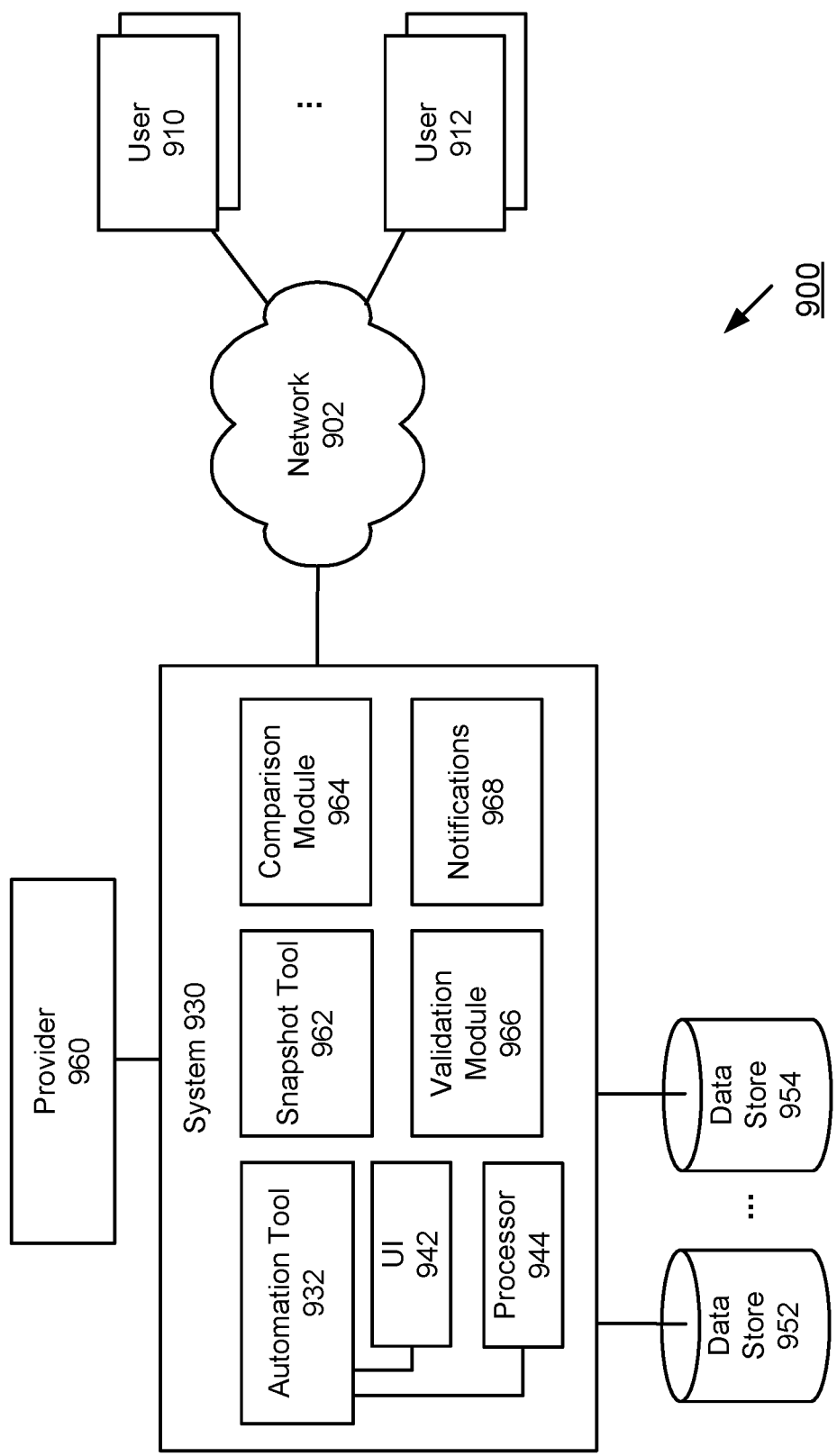
FIG. 9 is an exemplary system diagram, according to an embodiment of the present invention.

FIG. 9 is an exemplary system diagram, according to an embodiment of the present invention. Users 910, 912 may interact with an embodiment of the present invention provided by System 930 through Network 902. As illustrated in FIG. 9, Users 910, 912 may use various computing devices, such as computers, laptops, workstations, kiosks, terminals, tablets, mobile devices, mobile phones, smart devices, or other computing devices capable of sending or receiving processing signals. For example, computing devices may have an application installed that is associated with an Entity that operates System 930. System 930 may be integrated with various systems and applications that support SDLC processes. As shown in FIG. 9, System 930 may include an Automation Tool 932 manages software promotion from different perspectives by using dynamic value injection and automation. Automation Tool 932 further takes current version snapshots, manages change logs for audit, performs version validation for match and unmatched build post promotion, and provides notifications and/or alerts. While FIG. 9 illustrates individual devices or components, it should be appreciated that there may be several of such devices to carry out the various exemplary embodiments.

Automation Tool 932 may incorporate modules and other functions, such as User Interface (UI) 942 and Processor 944. Other modules may include Snapshot Tool 962, Comparison Module 964, Validation Module 966 and Notifications 968. These modules are exemplary and illustrative, Automation Tool 932 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 930 may be communicatively coupled to data storage devices represented by Data stores 952, 954. Also, Data stores 952, 954 may also store and maintain source environment data, target environment data, comparison data, source code, reports, performance data, validation data, notifications, analytics, etc. The software promotion features using dynamic value injection and automation herein may be provided by an Entity and/or a third party provider, represented by 960, where Provider 960 may operate with System 930 and/or an Entity.

The system 900 of FIG. 9 may be implemented in a variety of ways. Architecture within system 900 may be implemented as hardware components (e.g., module) within one or more network elements. It should also be appreciated that architecture within system 900 may be implemented in computer executable software (e.g., on a tangible, non-transitory computer-readable medium) located within one or more network elements. Module functionality of architecture within system 900 may be located on a single device or distributed across a plurality of devices including one or more centralized servers and one or more mobile units or end user devices. The architecture depicted in system 900 is meant to be exemplary and non-limiting. For example, while connections and relationships between the elements of system 900 is depicted, it should be appreciated that other connections and relationships are possible. The system 900 described below may be used to implement the various methods herein, by way of example. Various elements of the system 900 may be referenced in explaining the exemplary methods described herein.

Network 902 may be a wireless network, a wired network or any combination of wireless network and wired network. For example, Network 902 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 902 may support an Internet network, a wireless communication network, a cellular network, Bluetooth, or the like, or any combination thereof. Network 902 may further include one, or any number of the exemplary types of networks mentioned above operating as a stand-alone network or in cooperation with each other. Network 902 may utilize one or more protocols of one or more network elements to which it is communicatively coupled. Network 902 may translate to or from other protocols to one or more protocols of network devices. Although Network 902 is depicted as one network for simplicity, it should be appreciated that according to one or more embodiments, Network 202 may comprise a plurality of interconnected networks, such as, for example, a service provider network, the Internet, a cellular network, corporate networks, or even home networks, or any of the types of networks mentioned above.

Data may be transmitted and received via Network 902 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

System 930 may be communicatively coupled to Data Stores 952, 954 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 902, or communications may involve a direct connection between the various storage components and System 930, as depicted in FIG. 9. The storage components may also represent cloud or other network based storage.

Figure 10:
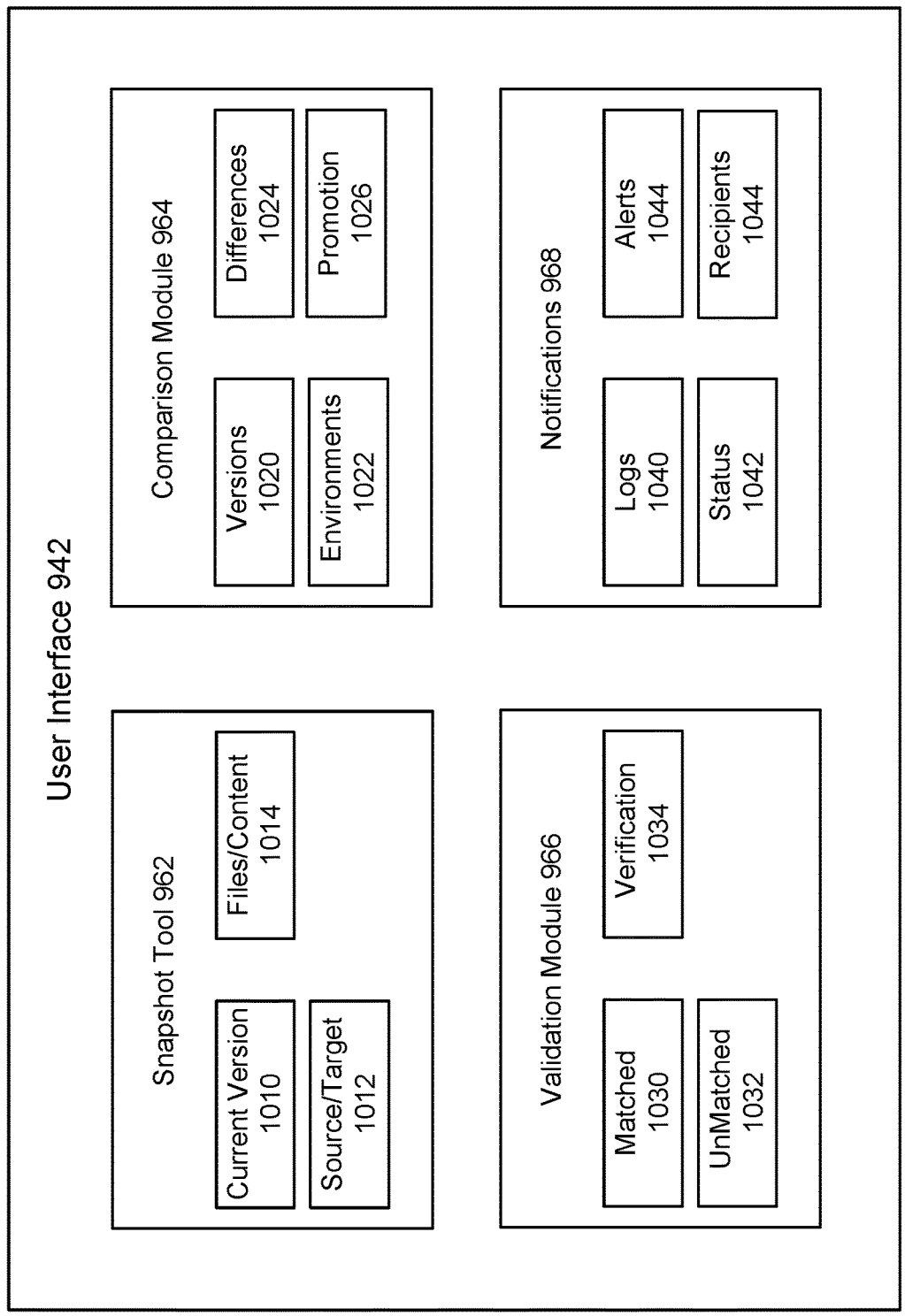
FIG. 10 is an exemplary interactive user interface, according to an embodiment of the present invention.

FIG. 10 is an exemplary interactive user interface, according to an embodiment of the present invention. As shown in FIG. 10, User Interface 942 may include various modules including Snapshot Tool 962, Comparison Module 964, Validation Module 966 and Notifications 968. User Interface 942 may provide various views and displays.

Snapshot Tool 962 may capture a current software version as represented by 1010. Snapshot data may relate to source environment and/or target environment 1012. Snapshot Tool may capture a set of values including release unit, target environment and source version. The snapshot may be generated and captured as a corresponding text file that may be saved/stored at Files/Content 1014.

Comparison Module 964 may perform a comparison to identify one or more differences between a build version and a configuration version (represented by Versions 1020) associated with the source environment and the target environment (represented by Environments 1022). Any differences may be identified at Differences 1024. Based on the comparison and differences, a new version may be promoted by 1026. The set of values from the snapshot may be dynamically injected to a target environment.

Validation Module 966 may perform a verification of post promotion build and configuration versions to identify matched and unmatched status for a plurality of software elements at Matched 1030 and UnMatched 1032. The verification or validation data and results may be identified and stored by Verification 1034.

Notifications 968 may include Logs 1040, Status 1042 and Alerts 1044. One or more recipients may be identified by 1044.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C #, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a software release update automation tool using dynamic value injection and without reliance on version numbers when promoting a new version from a source environment to a target environment, the system comprising:
   a memory component that stores software version data;
   an interactive user interface, coupled to the memory component, configured to receive user input; and
   a computer processor, coupled to the memory component and the interactive user interface, and further programmed to perform the steps of:
      executing an Automation Tool to promote the new version from a source environment to a target environment;
      generating a snapshot of a current software version of the source environment and target environment wherein the snapshot comprises a set of values representing a release unit, the target environment and a source version;
      performing a comparison to identify one or more differences between a build version and a configuration version associated with the source environment and the target environment;
      based on the comparison and the one or more differences, promoting the new version to a target environment by dynamically injecting the set of values from the snapshot;
      performing a verification of post promotion build and configuration versions to identify matched and unmatched status for a plurality of software elements;
      based on the verification, generating a configuration log; and
      transmitting, via a communication network, the configuration log to one or more recipients.

2. The system of claim 1, wherein the Automation Tool is executed with a command line interface.

3. The system of claim 1, wherein the configuration log comprises audit log, change confirmation, notification and alerts.

4. The system of claim 1, wherein the release unit is common to both the source environment and the target environment.

5. The system of claim 1, wherein the matched and unmatched status for a plurality of software elements relates to one or more of: release units, versions and build versions.

6. The system of claim 1, wherein the Automation Tool operates in query mode and an execution mode.

7. The system of claim 1, wherein the snapshot is generated and referenced as a corresponding text file.

8. The system of claim 1, wherein the set of values of the snapshot is generated dynamically and injected at runtime when promoting the new version to the target environment.

9. The system of claim 1, wherein the source environment is different from the target environment and comprises one of: development environment (DEV); system integration testing environment (SIT); performance testing environment (PTE); user acceptance testing environment (UAT) and production environment (PROD).

10. The system of claim 1, wherein the target environment is different from the target environment and comprises one of: development environment (DEV); system integration testing environment (SIT); performance testing environment (PTE); user acceptance testing environment (UAT) and production environment (PROD).

11. A method that implements a software release update automation tool using dynamic value injection and without reliance on version numbers when promoting a new version from a source environment to a target environment, the method comprising the steps of:
   executing, via a computer processor, an Automation Tool to promote the new version from a source environment to a target environment;
   generating, via the computer processor, a snapshot of a current software version of the source environment and target environment wherein the snapshot comprises a set of values representing a release unit, the target environment and source version;
   performing, via the computer processor, a comparison to identify one or more differences between a build version and a configuration version associated with the source environment and the target environment;
   based on the comparison and one or more differences, promoting the new version to a target environment by dynamically injecting the set of values from the snapshot;
   performing a verification of post promotion build and configuration versions to identify matched and unmatched status for a plurality of software elements;
   based on the verification, generating a configuration log; and
   transmitting, via a communication network, the configuration log to one or more recipients.

12. The method of claim 11, wherein the Automation Tool is executed with a command line interface.

13. The method of claim 11, wherein the configuration log comprises audit log, change confirmation, notification and alerts.

14. The method of claim 11, wherein the release unit is common to both the source environment and the target environment.

15. The method of claim 11, wherein the matched and unmatched status for a plurality of software elements relates to one or more of: release units, versions and build versions.

16. The method of claim 11, wherein the Automation Tool operates in query mode and an execution mode.

17. The method of claim 11, wherein the snapshot is generated and referenced as a corresponding text file.

18. The method of claim 11, wherein the set of values of the snapshot is generated dynamically and injected at runtime when promoting the new version to the target environment.

19. The method of claim 11, wherein the source environment is different from the target environment and comprises one of: development environment (DEV); system integration testing environment (SIT); performance testing environment (PTE); user acceptance testing environment (UAT) and production environment (PROD).

20. The method of claim 11, wherein the target environment is different from the target environment and comprises one of: development environment (DEV); system integration testing environment (SIT); performance testing environment (PTE); user acceptance testing environment (UAT) and production environment (PROD).

* * * * *